Oct. 24, 1961  C. A. BILLMAN  3,005,365
BORING BAR
Filed May 19, 1958  2 Sheets-Sheet 1
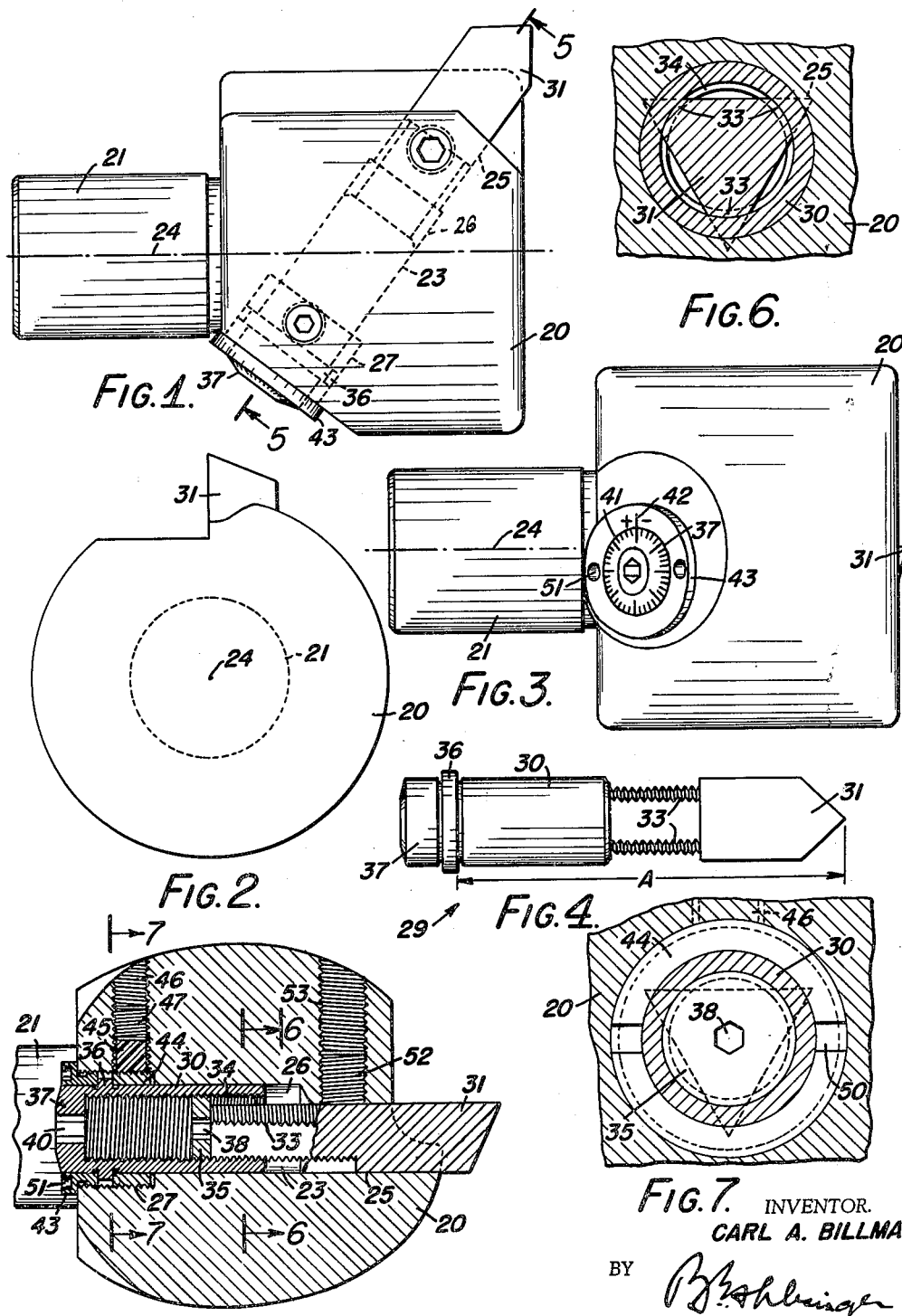
INVENTOR.
CARL A. BILLMAN
BY
ATTORNEY

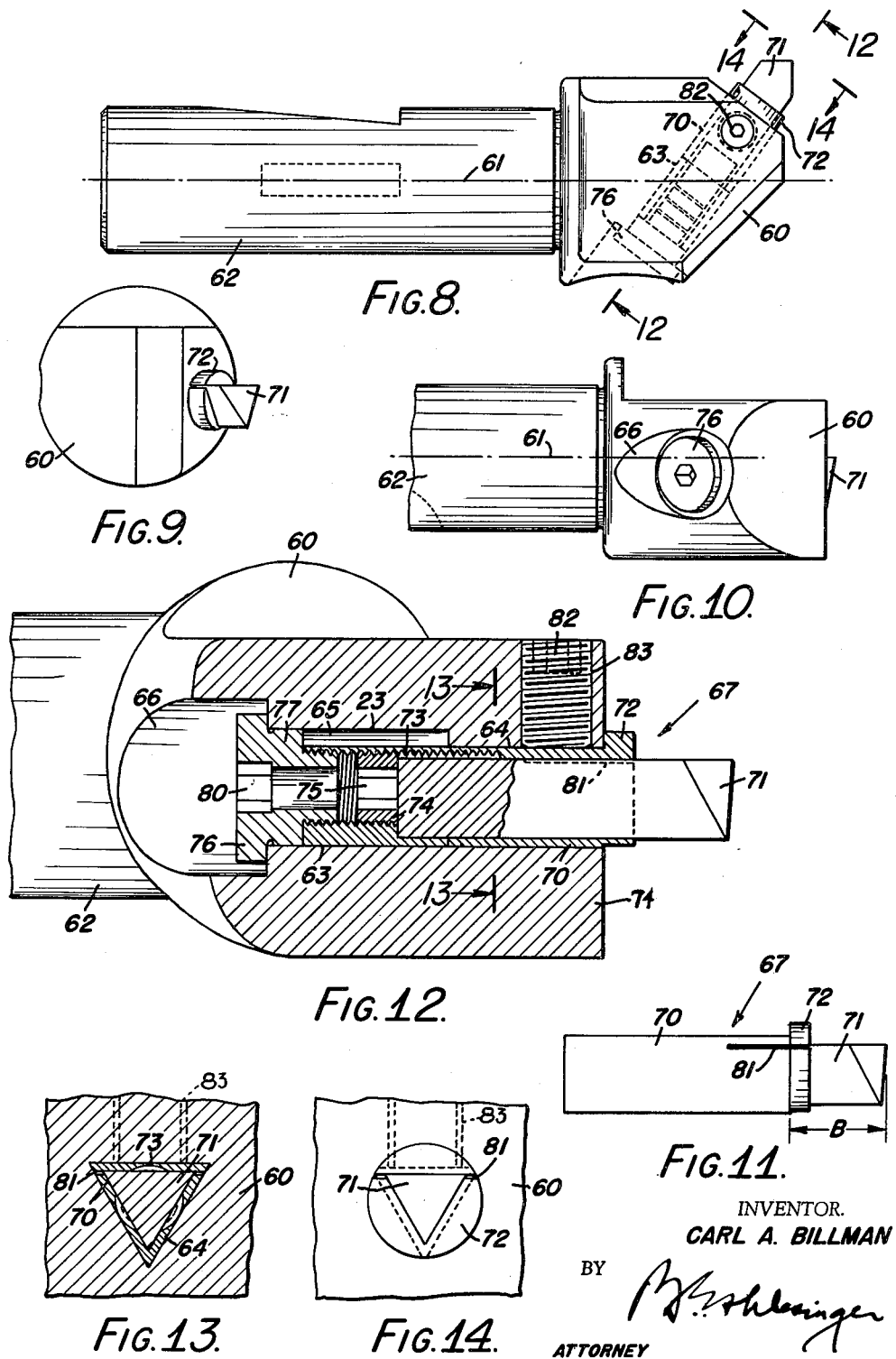

3,005,365
Patented Oct. 24, 1961

3,005,365
BORING BAR
Carl A. Billman, Rochester, N.Y.
(35 Trowbridge Trail, Pittsford, N.Y.)
Filed May 19, 1958, Ser. No. 736,254
8 Claims. (Cl. 77—58)

This invention relates to metal cutting tools, and more particularly to boring tools.

In conventional practice, the boring tool is adjusted rectilinearly in a lathe or boring mill to bring the tool into proper cutting position initially and to compensate for tool wear after sharpening. The adjustment is time-consuming if it is to be made with accuracy. Moreover, while it is being made a costly machine is shut down.

One object of the present invention is to provide a boring tool holder and tool bit assembly that will permit of adjusting the tool bit assembly outside the machine so that the assembly can just be shoved into place in the holder and the tool will be in proper cutting position.

A companion object of the invention is to provide a tool bit assembly that can be pre-set for any desired depth of cut outside the machine and can readily be substituted in the tool holder for another such assembly without the necessity of scaling or adjusting the tool in the tool holder.

Another object of the invention is to provide a tool holder and assembly of the character described in which the tool bit has a precisely controllable adjustment.

Another object of the invention is to provide a boring tool assembly and tool holder of the character described in which the tool has the delicate adjustment required for finish boring, yet has the ruggedness of mounting required of a roughing tool.

A related object of the invention is to provide a boring tool bit assembly and holder of the character described which will permit of adjusting the tool for wear or any other reason easily and simply while mounted in the tool holder.

Other objects of the invention will be apparent hereinafter from the specification and from the recital of the appended claims.

In the drawings:

FIG. 1 is a side elevation of a boring bar constructed according to one embodiment of this invention, with a boring tool assembly mounted in operative position therein;

FIG. 2 is an end view thereof;

FIG. 3 is a side elevation of the boring bar rotated 90° from the position shown in FIG. 1;

FIG. 4 is a top view of the boring tool assembly;

FIG. 5 is a section taken on the line 5—5 of FIG. 1, looking in the direction of the arrows;

FIG. 6 is a section taken on the line 6—6 of FIG. 5, looking in the direction of the arrows;

FIG. 7 is a section taken on the line 7—7 of FIG. 5, looking in the direction of the arrows;

FIG. 8 is a side elevation of a boring bar constructed according to another embodiment of the invention, with a tool assembly mounted in operative position therein;

FIG. 9 is an end view thereof;

FIG. 10 is a side elevation of the boring bar shown in FIG. 9, rotated through a 90° angle from the position shown in FIG. 9, and partly broken away;

FIG. 11 is a side elevation of the tool assembly for the boring bar shown in FIG. 8;

FIG. 12 is a section taken on the line 12—12 of FIG. 8, looking in the direction of the arrows;

FIG. 13 is a section taken on the line 13—13 of FIG. 12, looking in the direction of the arrows; and FIG. 14 is a fragmentary view of the tool mounted in the head of the boring bar and taken on the line 14—14 of FIG. 8, looking in the direction of the arrows.

Referring now to the drawings by numerals of reference, and particularly to FIGS. 1 through 7 inclusive, 20 denotes the body of the boring bar. This has an integral, rearwardly-projecting shank 21 by means of which the boring bar may be supported from the tool post of a lathe or boring mill. In the instance shown, the shank 21 is cylindrical and its axis is denoted at 24.

The body 20 is provided with a bore or socket 23 (FIG. 5) that is inclined to the axis 24. The socket 23 is broached or otherwise formed to a generally equilateral triangular cross-section for the front portion 25 of its length. Rearwardly of the triangular portion 25, the socket 23 is formed with a cylindrical portion 26 that communicates at its front end with the triangular portion 25 of the socket, and that communicates at its rear with the cylindrical, tapped counterbore 27 that communicates with the bore 26. A stop nut 44 is adapted to be threaded into this counterbore 27 to a predetermined position for a purpose which will hereinafter appear, and is fixed in that position by lateral pressure exerted through a nylon block 45 that is seated in a hole 46 in the head 20 and that is pressed against the lock nut 44 by a screw 47 that is threaded into the hole 46.

The socket 23 is adapted to receive a tool bit assembly 29 comprising a generally cup-shaped barrel or cartridge 30 and a tool bit 31. The tool bit 31 is triangular in cross-section, corresponding in shape to the shape of the triangular portion 25 of the socket 23. Adjacent its inner end, however, the bit 31 is threaded but the diameter of the thread is such that the corners only of the blade are threaded, as denoted at 33, and the three side walls of the bit are otherwise smooth, as shown in FIGS. 4 and 6. The threaded portion of the bit 31 is threaded into the bore 34 of the barrel 30. A jam nut 35 is adapted to be threaded into the bore 34 of the barrel 30, to determine the extent to which the threaded portion of the tool bit projects into the barrel and the extent to which the cutting portion of the bit projects forwardly out of the barrel. The rear end of the tool bit seats against the jam nut 35. The jam nut 35 is formed with a hexagonal recess 38 to receive a wrench, whereby it may be threadingly adjusted in the barrel.

The barrel is formed externally with an integral peripheral flange 36, and is closed at its rear end by a wall 37 which is formed with a hexagonal hole 40 through which the wrench for the socket 38 can be passed and turned freely. Hole 40 may also receive a hexagonal socket wrench to rotate the barrel 30 on the jam nut 35. The end face of wall 37 is graduated as denoted at 41 (FIG. 3) to cooperate with a zero line 42 that is formed on the face of a lock nut 43 that is threaded into the counterbore 27 and that is formed with a cylindrical bore through which the barrel projects.

In use, the operator or the set-up man of the lathe or boring mill first determines the distance which the cutting edges of the tool are to project beyond the body 20. Then with the tool bit assembly in his hand, he rotates the barrel 30 relative to the tool bit 31, and using a micrometer sets the tip of the tool bit until the tip of the tool bit is a distance A (FIG. 4) away from the front face of the flange 36 of the barrel 30. This distance A is determined to give the tool bit the desired position when it is mounted in the body 20. Then, a hexagonal wrench is inserted through the hole 40 in the head 37 of the barrel, and into the hole 38 in the jam nut 35, and the nut 35 is tightened against the inner end surface of the bit 31 to hold the tool bit in the position to which it has been precisely adjusted.

The tool bit assembly is now ready for insertion into the body 20. When the machine operator wants to use the tool bit all that he needs to do is to shove it into the bore 23 of the body 20 until the front face of the flange 36 engages against the stop nut 44. A lock nut 43 is then threaded into the counterbore 27 of the body to lock the flange 36 tightly against the stop nut 44. A lock screw 52 is also threaded into a hole 53 in the body and tightened against the bit 31 to hold the tool bit securely in its socket. The stop nut 44 and the lock nut 43 are formed, respectively, with diametrally-opposed recesses 50 (FIG. 7) and 51 (FIGS. 3 and 5) to receive spanners for adjusting these parts.

Since the position of the stop nut 44 has been fixed in the factory, the preset distance "A" between the tip of the cutting blade 31 and the front radial face of the flange 36 of the tool bit assembly insures that the tool will be properly positioned in the body 20. It also permits tool bit assemblies to be substituted freely for one another in the head 20 without further adjustment.

Because the tool bits or blades 31 are triangular in cross-section, and are pressed by the screw 52 into a V-shaped seat provided in the triangular portion 25 of the bore 23, no keys, keyways, or lugs are needed to resist turning of the tool in its socket. Moreover, because only the corners of the blade are threaded at the inner end of the blade, greater blade life and strength are obtained despite the full adjustment provided.

The construction of the tool bit assembly and tool holder described permits of adjusting the tool bit or blade for wear or depth of cut, without removing it from the tool body 20. To effect this adjustment, the lock screw 52 is eased off, and a hexagonal wrench is inserted into the hexagonal socket 40 in the head 37 of the barrel. The barrel is then rotated in the desired direction to move the tool bit or blade in or out of the bore 23. The lock nut 43 has a zero mark 42 (FIG. 3) which reads against the graduations 41 on the end face of the wall 37 of the barrel, and by reading the graduations 41 against the zero line 42, the adjustment of the blade can be effected accurately. When the desired adjustment has been made, the jam nut 35 and the lock screw 52 are tightened to hold the bit or blade in adjusted position.

It will be appreciated that with the described structure very delicate adjustments are possible, while at the same time, a very rugged structure is provided so that the boring bar is versatile and can be used for roughing and for fine finish boring.

Another embodiment of the invention is illustrated in FIGS. 8 through 14 inclusive. Referring now to FIG. 8, 60 denotes the body of this modified form of boring bar. This body has an axially-extending shank 62 that can be secured to the tool post of a lathe or boring mill with its longitudinal axis 61 parallel to the axis of rotation of the work. The body 60 is provided with a bore or socket 63 that is inclined to the axis 61. This bore or socket is broached or otherwise formed, for part of its length 64, as before, to have a generally equilateral triangular cross-section (FIG. 12); and the inner portion of the socket 63 is formed with a smooth-walled cylindrical bore 65 that communicates with the triangular portion 64. The body 60 is formed with a peripheral recess 66 that communicates with the counterbore 65, for access to the counterbore.

In this embodiment of the invention, the tool bit 71 does not fit directly into the triangular portion 64 of the bore 63 of the body 60, but is mounted in a tubular casing 70 that in turn fits into the triangular portion 64. The casing 70 is of generally equilateral triangular shape in cross-section, to seat in the triangular portion 64 of the socket 63 and to receive the generally equilateral triangular tool bit 71. The casing 70 is formed on its front or outer end with a collar or flange 72 that is adapted to be engaged against the flat confronting face 74 of the body 60, as shown in FIG. 12.

The casing 70 is slit adjacent its front or outer end along two sides, as denoted at 81 in FIGS. 11, 13, and 14, to permit the front end of the casing to function as a collet to hold the tool bit. At its inner end, the casing 70 is internally threaded as denoted at 73, FIGS. 12 and 13. The diameter of the thread is such that the thread intersects the three side walls of the casing only for a short distance intermediate the sides of the respective walls, and these walls are smooth except where the thread intersects them as shown in FIG. 13. A jam nut 74 is threaded in the casing to form a seat determining the longitudinal position of the tool bit. The inner or rear end of the tool bit seats against this jam nut.

As in the first-described embodiment of the invention, the tool bit can be preset off the machine so that when mounted on the machine in the body 60 it will be in proper position for cutting. In the case of the assembly shown in FIGS. 8 to 14, the distance between the rear face of collar or flange 72 and the tip of the tool bit is scaled or measured with a micrometer and the tool bit is adjusted in the casing or holder 70 until its tip projects a distance B beyond the rear face of collar 72, which will insure that when the bit-holder assembly is mounted in body 60, the cutting edges of the tool bit will be in proper cutting position. The nut 74 serves to adjust the blade longitudinally in the casing 70 to control the amount that the blade projects beyond the flange 72. It can be used in setting the tool bit position initially and also in adjusting the tool bit to compensate for wear and the amount of stock removed from the blade during sharpening. The nut 74 is formed with a hexagonal hole 75 which is adapted to receive a hexagonal wrench used in adjusting the position of the nut.

In use, after the tool bit has been preset in its casing or holder 70, the casing is inserted in the bore 63, and is secured therein by a set-screw 82. Set-screw 82 engages and flexes the portion of casing 70 between the slits 81 so that the casing will grip tool bit 71. A plug 76 may also be threaded into the casing to close the portion 65 of bore 63. This plug is formed with a shoulder 77 that engages in the portion 65 of the bore 63 against the rear end of the casing. The head of the plug engages against the rear face of the body 60, as shown in FIG. 12, and cooperates with the flange 72 and set-screw 82 to hold the casing against longitudinal movement in the bore 63. The head of the plug 76 is formed with a hexagonal hole 80 through which a wrench can be passed for insertion into the socket 75 of the jam nut 74, and in which a larger hexagonal wrench can be inserted to rotate the plug 76. Plug 76 can be omitted, if desired, to permit quicker removal from body 60 and substitution of cartridge or tool bit assemblies.

In this embodiment of the invention, the tool bit is squeezed and gripped between the walls of the blade-receiving, generally equilateral triangular portion of the casing 70, and the wall of the casing fits in the bore 63 in the body 60, thus providing solid backing for sustaining the forces applied to the tool bit or blade during cutting. Adjustment of the blade for wear may be effected by rotating nut 74 to shift the tool bit or blade endwise. It is not necessary to loosen the lock screw 82. The frictional grip of the casing on the tool holds the tool securely during use; but when the nut 74 is rotated its pressure on the tool is sufficient to overcome the friction and the tool is adjusted also.

This is an important feature of the invention. In all prior known tools the lock means must first be loosened before adjustment of the tool can be made. This causes the exact setting of the tool to be lost. Since with the construction of the present invention, lock screw 82 need not be loosened to adjust the tool, the tool setting need not be disturbed. Hence when the adjusting nut 74 is advanced, the operator knows he is advancing the tool exactly from the prior setting.

In both embodiments of the invention, the tool bit can be preset precisely outside the bar or body 20 or 60 and outside the machine. Idle time of the machine is therefore reduced to a minimum. In both embodiments of the invention, a controlled adjustment of the tool position is achieved. With both embodiments of the invention spare, pre-set tool bit assemblies can be kept on hand, ready for use, and inserted in the boring bar or body when needed. Size will already be there. In both embodiments of the invention further adjustment for wear or cutting depth can also readily be made if required.

While the invention has been described in connection with different embodiments thereof, it will be understood that it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A tool blade assembly for a cutting tool body that has a socket therein adapted to receive said assembly in use, said assembly comprising a blade of generally aquilateral triangular cross-section that is formed with a cutting tip at one end and with a peripherally threaded portion adjacent its opposite end, and a generally cylindrical barrel formed with a threaded bore in which said portion of said blade is threaded, said barrel being formed with an integral flange that has a flat face perpendicular to its axis to provide a gaging surface to permit the position of said blade to be measured precisely in said barrel, and a jam nut threadably adjustable in said barrel and adapted to be abutted against said opposite end of said blade to fix the longitudinal position of said blade.

2. A cutting tool comprising a body having a bore therein which is of polygonal cross section for at least a portion of its length and which is of circular cross-section for another portion of its length to receive a tool blade assembly, a tool blade assembly mounted in said bore and comprising a blade of polygonal cross-section for a portion of its length, at least, to fit in the polygonal section of said bore and that is formed with a cutting tip at one end and with an externally threaded portion adjacent its opposite end, a hollow, internally-threaded, generally cylindrical barrel into which said threaded portion of said blade is threaded, said barrel having a gauging surface thereon for effecting precise longitudinal location of said blade in said barrel, said barrel being positioned in the circular cross-sectional portion of said bore cooperating means on confronting surfaces, one of which is on said barrel and the other of which is fixed relative to said body for indicating the longitudinal adjustment of said blade, and including a graduated scale disposed on one said surface and a datum mark on the other said surface against which said scale registers, means threaded into said barrel and against which said opposite end of said blade seats to determine the position of said blade axially of said barrel, and means releasably engageable against said barrel to secure said barrel against longitudinal movement in said bore.

3. A cutting tool comprising a body having a bore therein which is polygonal in cross section for at least a portion of its length to receive a tool blade assembly, a tool blade assembly mounted in said bore and comprising a blade of polygonal section for a portion of its length that is formed with a cutting tip at one end and with a peripherally threaded portion adjacent its opposite end, an internally threaded cylindrical barrel into which said threaded portion of said blade is threaded, a flange integral with said barrel and formed with a flat face perpendicular to the axis of said barrel, said bore being formed with a portion of polygonal section through which said blade extends and with another portion of generally cylindrical shape in which said barrel is seated, and a member having a face against which said face of said flange is engaged to fix precisely the position of said barrel in said cylindrical bore, said barrel being rotatable in said bore to adjust said blade longitudinally relative to said body.

4. A cutting tool comprising a body having a bore therein, a tool blade assembly mounted in said bore and comprising a blade of generally equilateral triangular cross-section that is formed with a cutting tip at one end and with an externally threaded portion adjacent its opposite end, a generally cylindrical barrel having a threaded bore, the threaded portion of said blade being threaded into the second-named bore, an external flange integral with said barrel, said flange having a flat face at one side perpendicular to the axis of said barrel, the first-named bore having a portion of generally equilateral triangular cross-section in which said blade is seated and having another portion of generally cylindrical shape in which said barrel is seated, stop means fixed in said body to engage said flat face of said flange to determine the position of said barrel in said first-named bore, and means engageable against the opposite side of said flange to secure said barrel against longitudinal movement in said first-named bore.

5. A cutting tool comprising a body having a socket therein to receive a tool blade assembly to hold a blade in operative position, a tool blade assembly mounted in said socket and comprising a blade of generally equilateral triangular cross-section that is formed with a cutting tip at one end and to project beyond said body and with a peripherally threaded portion at its opposite end, a cup-shaped barrel that is formed with a threaded bore, the threaded end of said blade being threaded into said bore, a jam nut threaded into said bore and abutted against the inner end surface of said blade, said barrel being formed with an integral peripheral flange that has a flat face perpendicular to the axis of said barrel to provide a gaging surface for precise longitudinal adjustment of said blade in said barrel, said socket being formed with a portion of generally equilateral triangular cross-section in which said blade is seated and with another portion of generally cylindrical shape in which said barrel is seated, said socket also being formed with a threaded counterbore that is coaxial with said bore, a stop member threadably positioned in said counterbore against which said face of said flange abuts to determine the adjusted position of said blade, a lock nut threaded into said counterbore and engageable against said flange to secure said barrel against longitudinal movement in said socket, cooperating means on confronting surfaces, one of which is the end face of said barrel and the other of which is the end face of said lock nut, including a graduated scale disposed on one said surface and a datum mark on the other said surface against which said scale registers, to effect measurement of the longitudinal adjustment of the blade, said blade being longitudinally adjustable in said barrel upon rotation of said barrel, and means engageable with said blade to press the blade laterally in the socket.

6. A cutting tool comprising a body having a socket therein of polygonal cross-section, a tool blade assembly mounted in said socket and comprising a blade of polygonal cross-section that is formed with a cutting tip at its front end, a casing in which said blade is mounted with its cutting tip projecting beyond said casing at one end of said casing, said casing having an internal cross-sectional shape for a part of its length corresponding to the cross-sectional shape of said blade and said casing having an external cross-sectional shape for a part of its length at least corresponding to the cross-sectional shape of said socket, a nut threaded in said casing and engageable with the rear surface of said blade to define an adjustable rear abutment for the blade to fix the distance of projection of the blade tip beyond the casing, said casing being formed at its front end with a flange engageable against the front outer surface of said body to hold said casing against rearward lengthwise movement in said socket, the front portion of said casing being slit lengthwise, means mounted in said body and engageable with said casing to press the casing laterally to clamp said blade in said casing and to press the casing against opposite walls of the socket, and a plug threadable into said casing at the rear of said casing and engageable against the rear outer face of said body to hold said casing against forward lengthwise movement in said socket.

7. A cutting tool comprising a body having a socket therein of generally equilateral triangular cross-section, a tool blade assembly removably mounted in said socket and comprising a blade of generally equilateral triangular cross-section that is formed with a cutting tip at its front end, a casing of externally generally equilateral triangular shape in cross-section and having a bore of generally equilateral triangular shape in cross-section in which said blade is mounted to have its cutting tip project beyond said casing at one end of said casing, a nut threaded in said casing and engageable with the rear surface of said blade to define an adjustable rear abutment for the blade to fix the distance of projection of the cutting tip beyond the casing, said casing being formed at its front end with a flange one face of which is engageable against the front outer face of said body to hold said casing against rearward lengthwise movement in said socket and one face of which provides a gauging surface from which the forward projection of said cutting tip beyond said casing can be measured precisely, the front portion of said casing being slit lengthwise to make said casing flexible, means mounted in said body and engageable against the outer surface of said split portion of said casing to clamp said blade in said casing and to press said casing laterally in said socket, and a plug threadable into said casing at the rear of said casing and engageable against the rear outer face of said body to hold said casing against forward lengthwise movement in said socket.

8. A cutting tool comprising a body having a socket therein, a tool blade assembly mounted in said socket and comprising a blade of substantially equilateral triangular cross-section that is formed with a cutting tip at its front end, a casing of externally substantially equilateral triangular shape in cross-section for part of its length at least and having a bore of substantially equilateral triangular shape in cross-section in which said blade is mounted to have its cutting tip project beyond said casing at one end of said casing, at least the rear portion of said casing being threaded, a nut threaded in said casing and engageable with the rear surface of said blade to define an adjustable rear abutment for the blade to fix the distance of projection of the cutting tip beyond the casing, said casing being formed at its front end with an external flange engageable against the outer surface of said body to hold said casing against rearward lengthwise movement in said socket, said flange having a flat face at one side from which the forward projection of said cutting tip beyond said casing can be measured, the front portion of said socket being of generally equilateral triangular shape in cross-section corresponding to the external cross-sectional shape of said casing to receive said casing therein and to provide a V-shaped seat along one side, the front portion of said casing being slit lengthwise to make said casing flexible, means mounted in said body and engageable against the outer surface of the front portion of said casing to clamp said blade in said casing and to press the casing laterally in said socket, the rear portion of said socket being cylindrical, and a plug threadable into said casing at the rear of said casing and engageable against the rear outer surface of said body to hold said casing against forward lengthwise movement in said socket, said plug being formed with a cylindrical portion engageable in the bore of said socket to hold said casing against forward movement in said socket.

References Cited in the file of this patent
UNITED STATES PATENTS

| | | |
|---|---|---|
| 882,529 | Melvin | Mar. 17, 1908 |
| 1,231,347 | Heiser | June 26, 1917 |
| 2,050,413 | Baumbach | Aug. 11, 1936 |
| 2,274,244 | Miller | Feb. 24, 1942 |
| 2,353,079 | Rice | July 4, 1944 |
| 2,524,374 | Briney | Oct. 3, 1950 |
| 2,793,547 | Benjamin | May 28, 1957 |

FOREIGN PATENTS

| | | |
|---|---|---|
| 510,851 | Great Britain | Aug. 9, 1939 |
| 521,875 | Great Britain | June 3, 1940 |
| 665,231 | Great Britain | Jan. 16, 1952 |